US012388722B2

(12) United States Patent
Alasti et al.

(10) Patent No.: US 12,388,722 B2
(45) Date of Patent: Aug. 12, 2025

(54) MULTI-CLOUD DATA CENTER ARCHITECTURES FOR PROVIDING NETWORK FUNCTIONS IN TELECOMMUNICATIONS NETWORKS

(71) Applicant: DISH Wireless L.L.C., Englewood, CO (US)

(72) Inventors: Mehdi Alasti, Arlington, VA (US); Kazi Bashir, Lewisville, TX (US); Siddhartha Chenumolu, Ashburn, VA (US)

(73) Assignee: DISH Wireless L.L.C., Littleton, CO (US)

( * ) Notice: Subject to any disclaimer, the term of this patent is extended or adjusted under 35 U.S.C. 154(b) by 55 days.

(21) Appl. No.: 18/395,022

(22) Filed: Dec. 22, 2023

(65) Prior Publication Data

US 2025/0211500 A1 Jun. 26, 2025

(51) Int. Cl.
*H04L 41/40* (2022.01)
(52) U.S. Cl.
CPC .................................. *H04L 41/40* (2022.05)

(58) Field of Classification Search
CPC ....................................................... H04L 41/40
See application file for complete search history.

(56) References Cited

U.S. PATENT DOCUMENTS

2022/0131830 A1* 4/2022 Dodd-Noble ....... H04L 61/2585
2024/0413892 A1* 12/2024 Nesteroff ........... H04B 7/18519

FOREIGN PATENT DOCUMENTS

WO WO-2022033662 A1 * 2/2022

* cited by examiner

*Primary Examiner* — Schquita D Goodwin
*Assistant Examiner* — Joseph M Cousins
(74) *Attorney, Agent, or Firm* — Kilpatrick Townsend & Stockton LLP

(57) ABSTRACT

Data center architectures for providing Network Functions (NFs) in telecommunications networks are disclosed. A 5G or 6G wireless service provider with an existing 5G or 6G core network in one or more clouds can add several NFs in another cloud to optimize certain service(s). These NFs may already exist in the core, but for different services. A 4G Long Term Evolution (LTE) customer could also incrementally migrate to a public cloud rather than migrating all NFs at once.

20 Claims, 16 Drawing Sheets

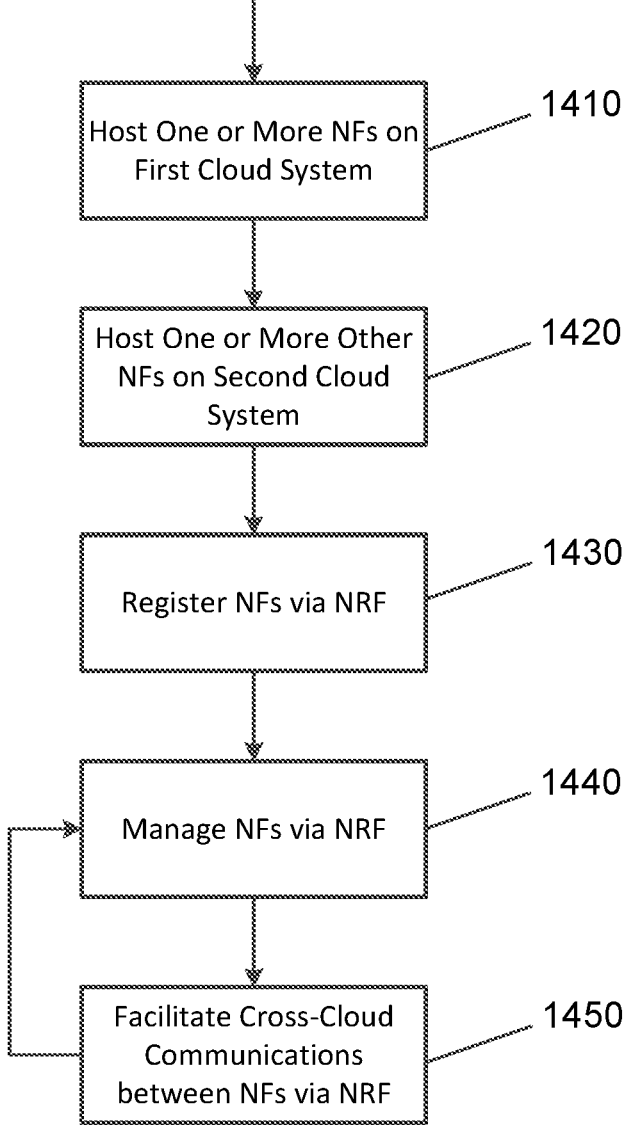

MULTI-CLOUD DATA CENTER ARCHITECTURES FOR PROVIDING NETWORK FUNCTIONS IN TELECOMMUNICATIONS NETWORKS

FIELD

The present invention generally relates to communications, and more specifically, to multi-cloud data center architectures for providing Network Functions (NFs) in telecommunications networks.

BACKGROUND

A variety of cloud service providers exist that provide cloud platforms for hosting various applications. However, these cloud providers have different capabilities. Accordingly, an improved and/or alternative approach may be beneficial.

SUMMARY

Certain embodiments of the present invention may provide solutions to the problems and needs in the art that have not yet been fully identified, appreciated, or solved by current communications technologies, and/or provide a useful alternative thereto. For example, some embodiments of the present invention pertain to multi-cloud data center architectures for providing NFs in telecommunications networks.

In an embodiment, a multi-cloud system for providing telecommunications services includes one or more computing systems of a first cloud system hosting one or more respective NFs and one or more computing systems of a second cloud system hosting one or more respective NFs. The multi-cloud system also includes a Network Repository Function (NRF) hosted by at least one computing system of the one or more computing systems of the first cloud system, at least one computing system of the one or more computing systems of the second cloud system, or one or more other computing systems that are not a part of the first cloud system or the second cloud system. The NRF manages the one or more NFs of the first cloud system and the second cloud system, respectively. The one or more respective NFs of the first cloud system and the one or more respective NFs of the second cloud system find one another using the NRF and communicate with one another over a control plane between the first cloud computing system and the second cloud computing system.

In another embodiment, a multi-cloud for providing telecommunications services includes one or more computing systems of a first cloud system hosting one or more respective NFs and one or more computing systems of a second cloud system hosting one or more respective NFs. The multi-cloud system also includes a NRF hosted by at least one computing system of the one or more computing systems of the first cloud system, at least one computing system of the one or more computing systems of the second cloud system, or one or more other computing systems that are not a part of the first cloud system or the second cloud system. The NRF manages the one or more NFs of the first cloud system and the second cloud system, respectively. The one or more respective NFs of the first cloud system, the one or more respective NFs of the second cloud system, or both, are containerized NFs (CNFs) or virtual NFs (VNFs) implemented by a platform for automating deployment, scaling, and management of containerized applications.

In yet another embodiment, a multi-cloud system includes one or more computing systems of a first cloud system hosting one or more respective NFs. The multi-cloud system also includes one or more computing systems of a second cloud system hosting one or more respective NFs, one or more Network Exposure Functions (NEFs) configured to expose respective NFs of the one or more respective NFs of the first cloud system to external applications, and one or more Application Programming Interfaces (APIs) configured to call the one or more NEFs. The multi-cloud system further includes an NRF hosted by at least one computing system of the one or more computing systems of the first cloud system, at least one computing system of the one or more computing systems of the second cloud system, or one or more other computing systems that are not a part of the first cloud system or the second cloud system. The NRF manages the one or more NFs of the first cloud system and the second cloud system, respectively. The one or more respective NFs of the first cloud system and the one or more respective NFs of the second cloud system find one another using the NRF and communicate with one another over a control plane between the first cloud computing system and the second cloud computing system. The one or more respective NFs of the first cloud system, the one or more respective NFs of the second cloud system, or both, are CNFs or VNFs implemented by a platform for automating deployment, scaling, and management of containerized applications.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 14 is a flowchart illustrating a process for providing multi-cloud telecommunications services, according to an embodiment of the present invention.

Unless otherwise indicated, similar reference characters denote corresponding features consistently throughout the attached drawings.

DETAILED DESCRIPTION OF THE EMBODIMENTS

Figure 1:
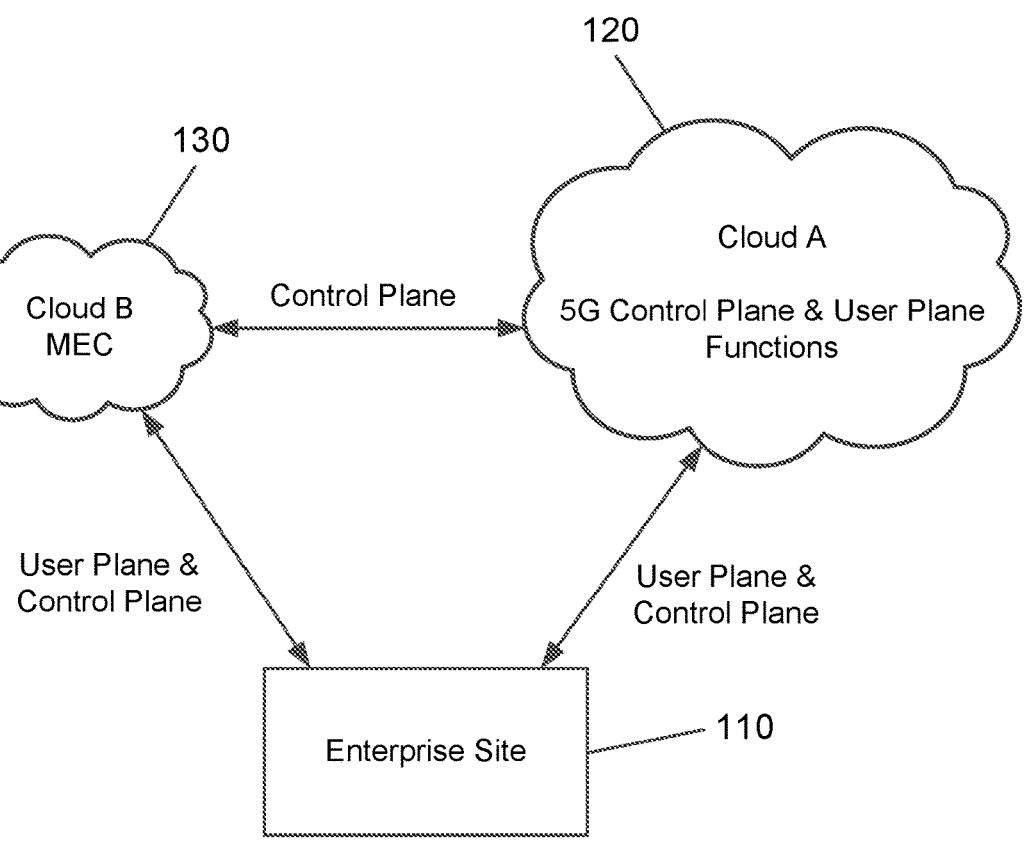
FIG. 1 is an architectural diagram illustrating a multi-cloud system where some NFs are hosted in one cloud and other NFs are hosted in another cloud, according to an embodiment of the present invention.

Some embodiments pertain to multi-cloud data center architectures for providing NFs in telecommunications networks. A 5G or Sixth Generation (6G) wireless service provider with an existing 5G or 6G core network in one or more clouds can add several NFs in another cloud to optimize certain service(s). These NFs may already exist in the core, but for different services. A 4G Long Term Evolution (LTE) customer could also incrementally migrate to a public cloud rather than migrating all NFs at once.

Currently in 5G, there is a shift to virtualization and containerization of NFs, microservices, cloud native, everything-as-a-service (XaaS), automation and orchestration, Continuous Integration and Continuous Delivery (CICD), automatic scaling (up and down), etc. This trend will likely continue into 6G and beyond. Also, artificial intelligence/machine learning (AI/ML) will be used in 5G Advance and 6G. This trend can provide flexibility, reduced time to market, lower total cost of ownership, and optimized network energy consumption for the service providers. Different public cloud providers offer different features and capabilities to differentiate themselves in this competitive market. A service provider can take advantage of multiple cloud provider offerings with different features to optimize network performance, services, energy consumption, and cost.

Various NFs exist in telecommunications networks, such as User Plane Function data traffic (UPF-d), UPF for voice traffic (UPF-v), Short Message Service Function (SMSF), Session Management Function (SMF), Unified Data Repository (UDR), Internet Protocol (IP) Multimedia Subsystem (IMS)+Telephone Answering Service (TAS), IP-SM Gateway (IP-SM-GW) (the network functionality that provides the messaging service in the IMS network), Enhanced Serving Mobile Location Center (E-SMLC) for former generation wireless networks, Gateway Mobile Location Center (GMLC), Location Retrieval Function (LRF), Location Management Function (LMF), Home Location Register (HLR), Home Subscriber Server (HSS), UPF+PGW-U, Access and Mobility Management Function (AMF), HSS+Unified Data Management (UDM), Authentication Server Function (AUSF), SMF+PGW-C, Short Message Service Center (SMSC), Policy Control Function (PCF), Mobile Edge Computing (MEC), Network Exposure Functions (NEFs) or Common API Framework (CAPIF) for Third Generation Partnership Project (3GPP) northbound APIs, Network Slice Selection Function (NSSF), Non-3GPP Inter-Working Function (N3IWF), Network Data Analytics Function (NWDAF), Mediation and Delivery Function (MDF), Service Communication Proxy (SCP), Security Edge Protection Proxy (SEPP), etc. The Network Repository Function (NRF) is a repository of profiles of the NFs that are available in the network, including those provided by multiple data centers in some embodiments. In other words, the NRF can coordinate between the NFs of multiple clouds.

The NRF is used appropriately for the management of NFs, service discovery and registration, and authorization. The purpose of the NRF is to allow a service consumer (e.g., an NF) to discover and select suitable service producers (i.e., NFs and NF services) without having to be configured beforehand. The NRF keeps a repository of the available NF instances and their exposed service instances. The repository is maintained dynamically by NF producers registering their so-called NF profile in the NRF. This, in turn, enables the NFs to discover other available NF instances, their service instances, and status dynamically. If one NF requires the services of another NF, it communicates with the NRF to find the other NF and communicate therewith. In other words, the NRF facilitates service discovery. The NF profile contains relevant data pertaining to the respective NF.

When a new instance of an NF is deployed or an existing instance is changed (e.g., due to scaling), the NRF is updated with the new profile information. The NRF can be updated by the NF itself or by another entity on behalf of the NF. There is also a keep alive mechanism that allows the NRF to maintain the repository and remove the profiles of missing or dormant NFs. The NF profile in the NRF contains information such as the NF type, address, capacity, supported NF services, and addresses for each NF instance. The information is provided to the NF service consumer in the discovery procedure and enough information for the service consumer to use the service-based interface of the selected NF and NF service. The NRF profile also contains authorization information, and the NRF only provides the profiles to a consumer that can discover the specific NF or service.

Communications between NF services on the control plane typically occur via HyperText Transfer Protocol 2 (HTTP2) Representative State Transfer (REST)-ful APIs. An NF service includes operations that are based on a request-response or a subscribe-notify model. Services are modeled as resources that are provisioned or can be created, updated, or deleted using RESTful HTTP2-based procedures.

Once an NF consumer has discovered NF producer instances, the NF consumer removes the NF producer instances that do not meet the desired service criteria (e.g., network slice, Data Network Name (DNN), etc.). From that smaller set, the NF consumer selects an NF producer instance, taking into account capacity, load, etc. If resources are created as part of a service request, the created resource is assigned a unique Uniform Resource Identifier (URI) pointing to the created resource.

The NRF provides three services to allow NFs and NF services to discover, select, and connect to peer NFs and NF services with the correct capabilities. These services are: Nnrf_NFManagement, Nnrf_NFDiscovery, and Nnrf_AccessToken. Nnrf_NFManagement enables NFs to register and manage their NF services and capabilities in the NRF. Nnrf_NFDiscovery allows NFs and NF services to discover other NFs and NF services that match the provided criteria. Nnrf_AccessToken allows the NFs to request Auth2.0 access tokens that can be used to access services from other NFs.

In multi-cloud implementations, the NRF should be able to register NFs in these clouds and be accessible to the NFs in the different clouds so NFs in one cloud can find and utilize the services of NFs in another cloud. The NRF may be housed in a different location than the clouds or may be at the location of one of the clouds, but able to register/deregister services of NFs regardless of their location. This may be achieved using Nnrf_NFManagement_NFRegister and Nnrf_NFManagement_NFDeregister service operations, respectively.

NFs in the cloud platforms may be grouped together in the same cluster (e.g., a Kubernetes® cluster) or hosted in separate clusters to minimize issues therebetween (e.g., due to configuration issues, memory leaks, etc.). NFs and/or clusters of NF groups could be located in different clouds to increase resiliency against problems with one of the sites. The NFs may be containerized NFs (CNFs) or virtual NFs at the microservice level.

Kubernetes® may be used to provide a portable, extensible, open source platform for managing containerized workloads and services that facilitates both declarative configuration and automation. Containers are similar to Virtual Machines (VMs). However, they have relaxed isolation properties to share the Operating System (OS) among the applications. Therefore, containers are considered lightweight. Similar to a VM, a container has its own file system, a share of Central Processing Unit (CPU) resources, memory, process space, etc. Since containers are decoupled from the underlying infrastructure, they are portable across clouds and OS distributions.

Kubernetes® runs workloads by placing containers into pods to run on nodes. A node may be a virtual machine or a physical machine, depending on the cluster design. Each node is managed by the control plane and contains the services necessary to run the pods. Typically, multiple nodes are included in a cluster.

A pod is the smallest and simplest Kubernetes® object, representing one or more running containers on a cluster that have shared storage and network resources, as well as a specification for how to run the containers. The contents of a pod are co-located and co-scheduled, as well as run in a shared context. A pod models an application-specific "logical host". It contains one or more application containers that are relatively tightly coupled. In non-cloud contexts, applications executed on the same physical or virtual machine are analogous to cloud applications executed on the same logical host. An example of a pod that consists of a container running the image dish:1.1.1 is provided below.

```
apiVersion: v1
kind: Pod
metadata:
  name: dish
spec:
  containers:
  - name: dish
    image: dish: 1.1.1
    ports:
    - containerPort: 80
```

FIG. 1 is an architectural diagram illustrating a multi-cloud system 100 where some NFs are hosted in one cloud and other NFs are hosted in another cloud, according to an embodiment of the present invention. In this embodiment, a 5G provider has its complete 5G core NFs in cloud 120. Cloud 120 provides control plane NFs including AMF, SMF, PCF, UDM, AUSF, UDR, NRF, and NEF (if used), as well as UPF for the user plane. Simply put, the control plane carries the signaling traffic and the user plane carries the user data (i.e., the content of the communications, such as voice and SMS, data, etc.).

Here, the 5G provider decides to support MEC for an enterprise located at enterprise site 110 with very low latency service. However, the 5G provider does not have a data center in the same region as enterprise site 110. In order to provide low latency MEC service, the 5G provider puts the MEC NFs in cloud 130, which is more proximate to enterprise site 110 and has latency and Quality of Service (QOS) capabilities to meet the low latency requirements for MEC. Enterprise site 110 uses cloud 120 for control plane NFs and UPF for non-MEC services (e.g., Internet, voice, SMS, etc.), but uses cloud 130 for control plane and user plane NFs for MEC. Cloud 120 and cloud 130 exchange control plane information with respect to MEC services, when required.

The MEC performs selection of a UPF relatively close to the mobile device and local UPF reselection based on mobility events for the mobile device. The MEC also provides concurrent access to a local Data Network (DN) and central DN in a single Protocol Data Unit (PDU) session. The MEC further supports MEC requests for local traffic steering locally (per mobile device or a group of mobile devices), provides local UPF access to applications, provides delivery of mobile device mobility information to trigger UPF reselection, indicates Local Access Data Network (LADN) availability, provides an interface for information exposure towards MEC applications, and provides charging support for locally steered traffic.

Consider the scenario where a 5G wireless provider is planning to support several private networks/enterprises. Such enterprises may have their own AMF, SMF, and UPF, or use a slice of the 5G provider. However, a specific cloud provider offers a lower cost and/or better performance to the 5G provider for certain services. The 5G provider decides to allocate specific control plane functions (e.g., UDM, UDR, and PCF) to this cloud for these enterprises.

Figure 2:
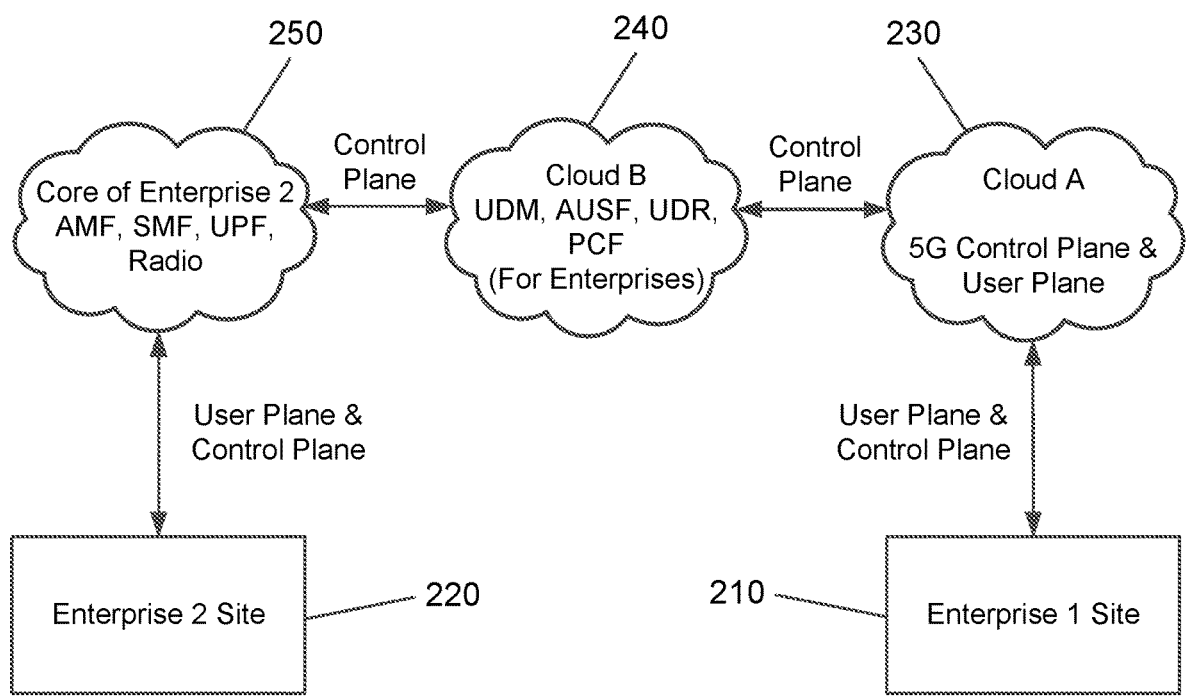
FIG. 2 is an architectural diagram illustrating a multi-cloud system where a 5G provider uses two clouds for different NFs and an enterprise has its own core for some services, according to an embodiment of the present invention.

FIG. 2 is an architectural diagram illustrating a multi-cloud system 200 where a 5G provider uses two clouds for different NFs and an enterprise has its own core for some services, according to an embodiment of the present invention. Here, one enterprise site 210 completely uses the NFs of the 5G provider (i.e., cloud B 240 via cloud A 230 for UDM, AUSF, UDR, and PCF and cloud A 230 for all other NFs). However, another enterprise site 220 uses a core 250 of that enterprise for AMF, SMF, UPF, and radio. Enterprise site 220 uses the 5G provider for the remaining NFs (i.e., cloud B 240 for UDM, AUSF, UDR, and PCF and cloud A 230 via cloud B 240 for all other NFs not hosted in enterprise core 250 or cloud B 240). However, it should be noted that any sets of NFs may be provided by cloud A 230 and cloud B 240 without deviating from the scope of the invention.

Figure 3:
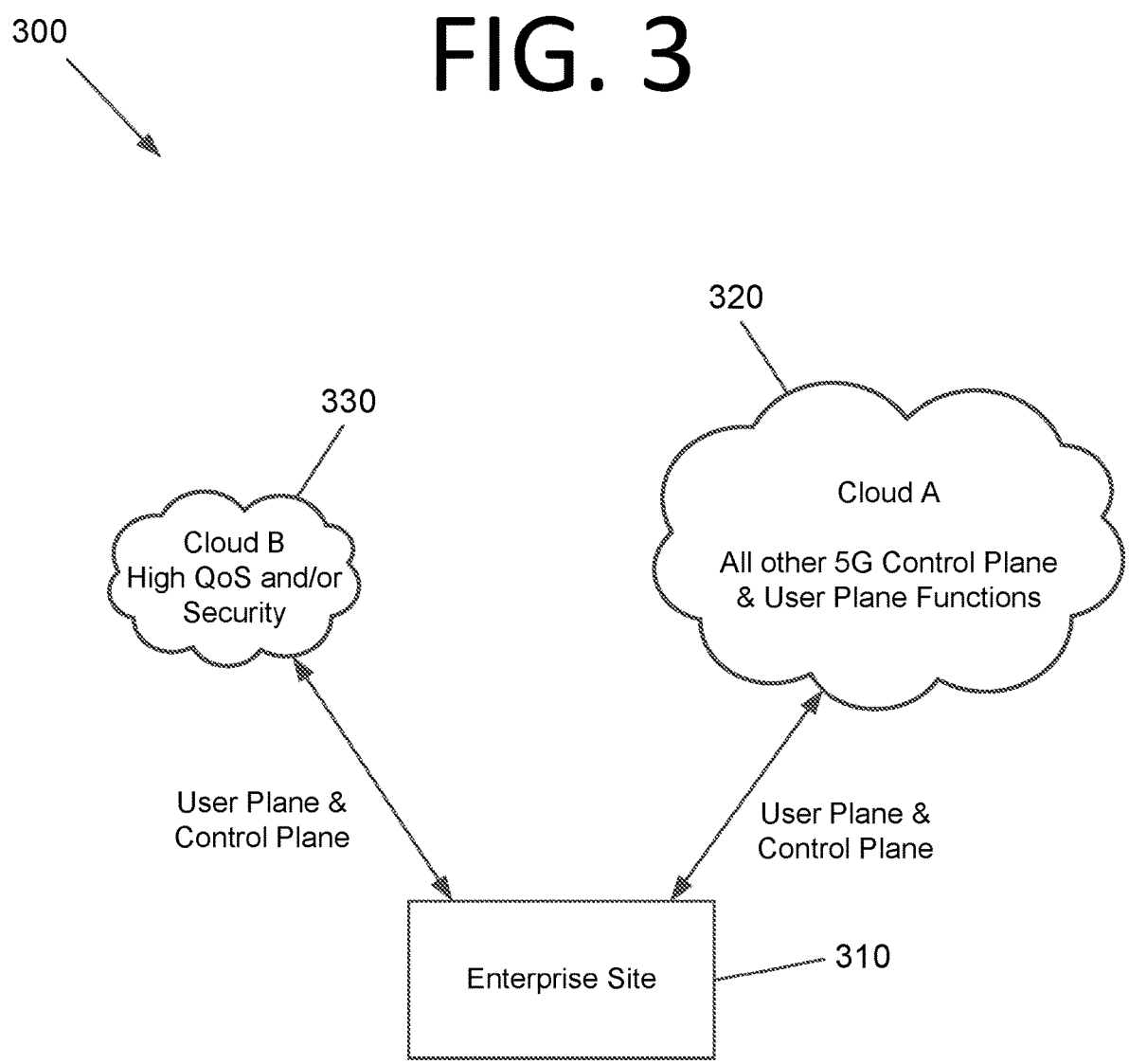
FIG. 3 is an architectural diagram illustrating a multi-cloud system where an enterprise uses a high Quality of Service (QOS) and/or security cloud for certain services and a 5G provider cloud for other services, according to an embodiment of the present invention.

In some cases, a certain cloud provider may support a better QoS and/or security features than one currently used by a 5G provider. A certain enterprise needs a high level of performance and/or security for specific services and is willing to pay for this higher performance and/or security. FIG. 3 is an architectural diagram illustrating a multi-cloud system 300 where an enterprise uses a high QoS and/or security cloud for certain services and a 5G provider cloud for other services, according to an embodiment of the present invention. In this scenario, enterprise site 310 uses cloud B 330 only for the services that require high QoS and/or high security. For QoS, UDR/UDM, SMF, UPF, Deep Packet Inspection (DPI), PCF, and NEF(s)/API(s) are involved. For security, SMF, UPF, DPI, and NEF(s)/API(s) are involved. Enterprise site 310 uses 5G provider cloud A 310 for all other services (e.g., due to a lower cost than cloud B 330). As such, enterprise site 310 can use cloud A 320 for "ordinary" services, such as voice, Internet, etc.

In some cases, a 5G provider may decide to expose its 5G core network to enterprises through the Network Exposure Function (NEF) (or CAPIF). The NEF supports interaction with external applications, exposing network capabilities that can be used in various ways by these applications. Some functions that may be available via the NEF provide monitoring network events associated with mobile devices, provisioning, and policy and charging control. CAPIF is a set of specifications from 3GPP to standardize some common capabilities exposed by 5G core network northbound APIs that provide a unified and standardized northbound API framework across several 3GPP functions, allowing for the utilization of 5G capabilities exposed on 5G networks. NEF and CAPIF can be used by enterprises for their specific target services.

Figure 4:
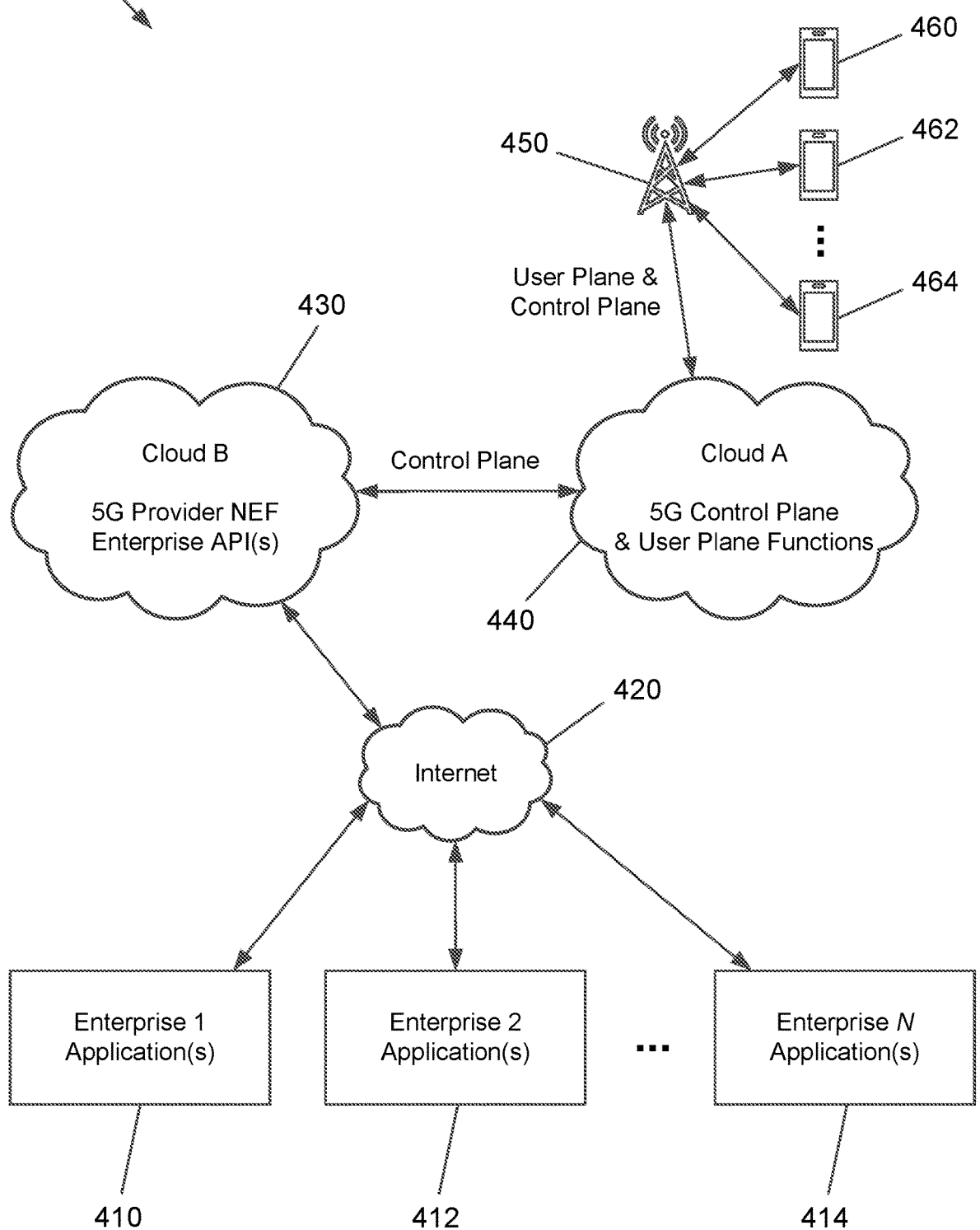
FIG. 4 is an architectural diagram illustrating a multi-cloud system where a 5G provider exposes its 5G core network to enterprises through Network Exposure Functions (NEFs), according to an embodiment of the present invention.

FIG. 4 is an architectural diagram illustrating a multi-cloud system 400 where a 5G provider exposes its 5G core network to enterprises through NEFs, according to an embodiment of the present invention. Enterprise applications 410, 412, . . . , 414 are able to call enterprise APIs on cloud B 430 via the Internet 420. Cloud B 430 also hosts NEFs (or CAPIFs) in this embodiment. The enterprise APIs make calls to the NEFs/CAPIFs, which, in turn, communicate with the appropriate NFs on 5G provider cloud A 440. Cloud A 440 communicates with mobile devices 460, 462, . . . , 464 via a Radio Access Network (RAN) 450. In this embodiment, Cloud B 430 is the better option for the 5G operator to enterprises to place the NEF/CAPIF and for the enterprises to place their APIs. This may be due to proximity, latency, cost, etc. It should be noted that various AF/NEF/CAPIF functions may be implemented using the architecture of FIG. 4, such as those shown in FIGS. 5A-C.

Different NEFs/CAPIFs may support different capabilities, have different capacities, etc. One enterprise may pay more to support specific feature(s), so they will be mapped to a better NEF/CAPIF. Another enterprise may be satisfied with basic features, and thus is not willing to pay more to use a more expensive NEF/CAPF.

Figure 5A:
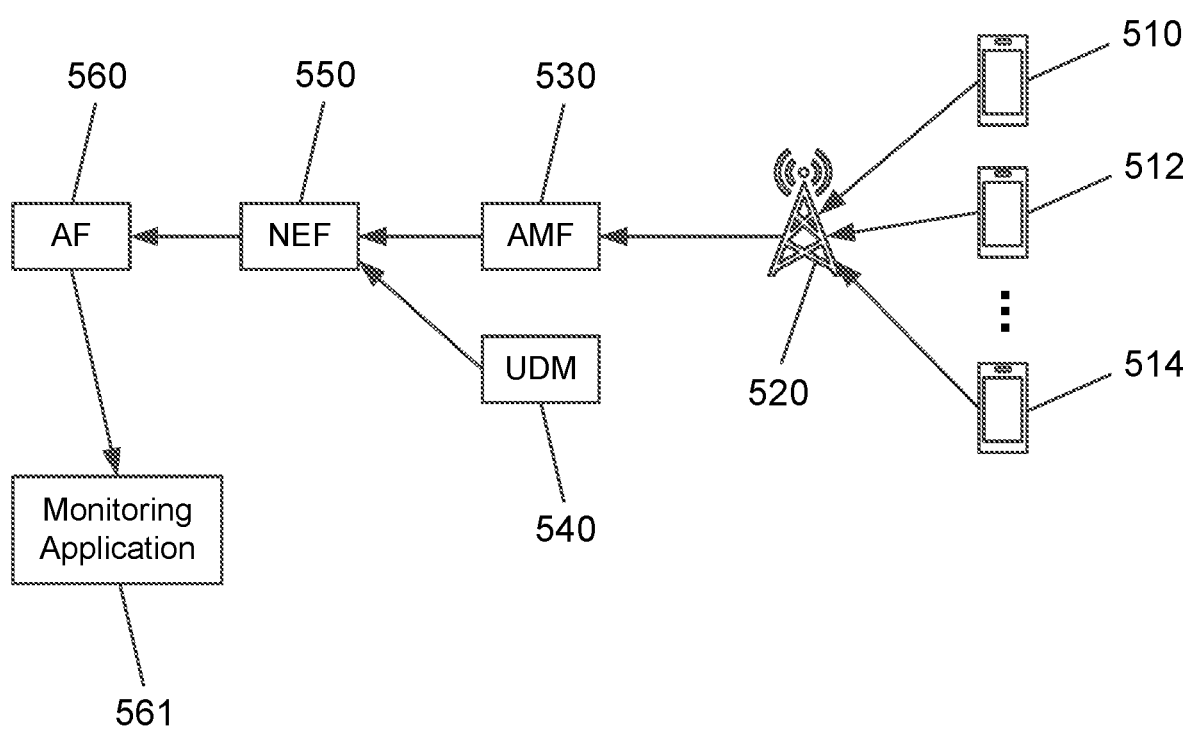
FIG. 5A is an architectural diagram illustrating an architecture for network event monitoring, according to an embodiment of the present invention.

FIG. 5A is an architectural diagram illustrating an architecture 500 for network event monitoring, according to an embodiment of the present invention. An external enterprise application 561 monitors network events associated with mobile devices 510, 512, . . . , 524. This monitoring may include whether mobile devices 510, 512, . . . , 524 are reachable, what their locations are, whether they are roaming, etc. monitoring application 561 calls AFs 560 that instructs an NEF 550 to retrieve this information from AMF 530 and UDM 540 via a Radio Access Network (RAN) (i.e., New Radio in 5G).

Figure 5B:
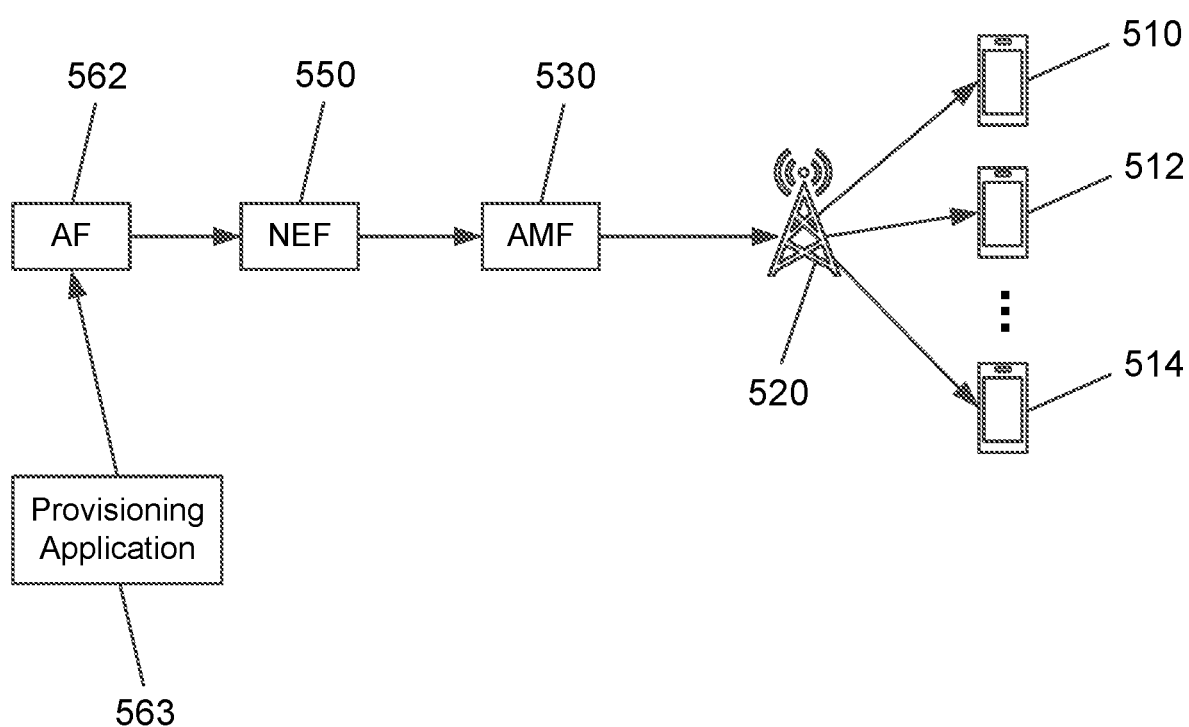
FIG. 5B is an architectural diagram illustrating an architecture for data provisioning from external applications, according to an embodiment of the present invention.

FIG. 5B is an architectural diagram illustrating an architecture 502 for data provisioning from external applications, according to an embodiment of the present invention. In this embodiment, a provisioning application 563 provisions information into the network via AF 562 that applies to mobile devices 510, 512, . . . , 524. This information may pertain to expected device mobility patterns, for example, which can be used by AMF 530 to instruct RAN 520 tune certain settings, such as how to minimize state changes for mobile devices 510, 512, . . . , 524 to optimize overall network signaling capacity.

Figure 5C:
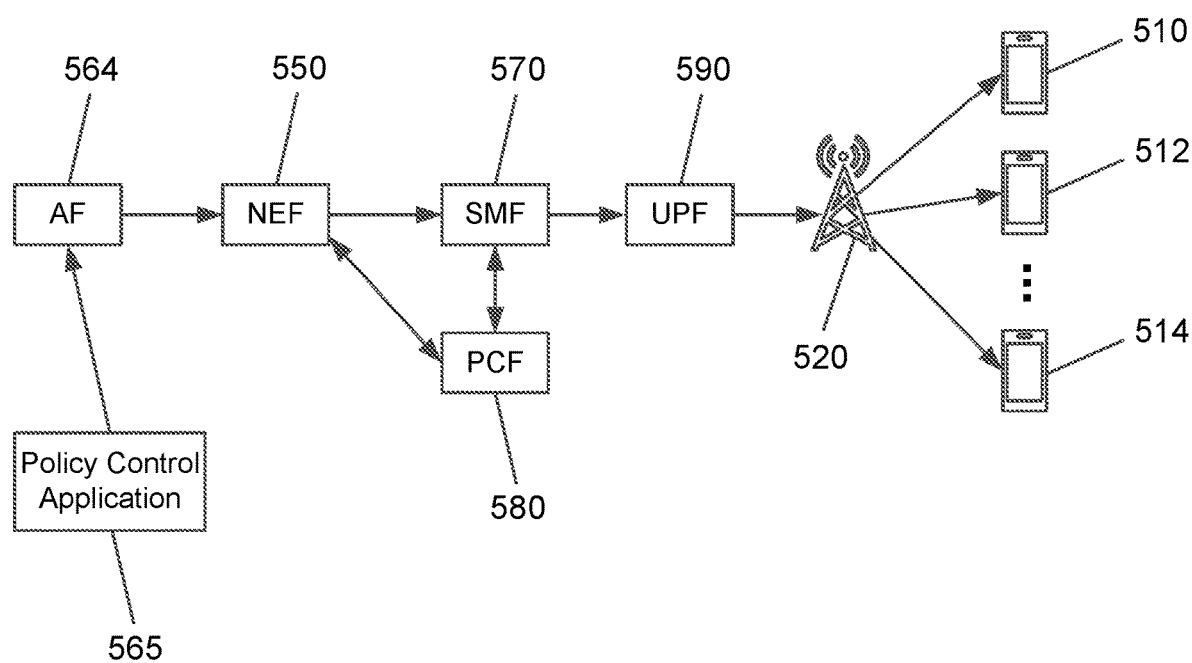
FIG. 5C is an architectural diagram illustrating an architecture for policy control from external applications, according to an embodiment of the present invention.

FIG. 5C is an architectural diagram illustrating an architecture 504 for policy control from external applications, according to an embodiment of the present invention. A policy control application 565 can use AF 564 and NEF 550 to control various aspects of data sessions, such as influencing traffic routing to influence when and how local breakout routing should be applied for certain devices. Also QoS and charging policies can be controlled and enforced by policy control application 565 via NEF 550, providing information about the data traffic. For such functionality, NEF 550 interacts with a PCF 580, which determines QoS and charging information based on application information provided by AF 564 and NEF 550.

Alternatively, support may be provided for negotiation of transfer policies for future background data transfer. NEF 550 may support allowing policy control application 565 to define background templates used in a UPF 590 to detect that certain traffic is related to specific external application traffic. NEF 550 may interact with an SMF 570 to achieve this, and SM 570 forwards these templates to UPF 590.

Figure 6:
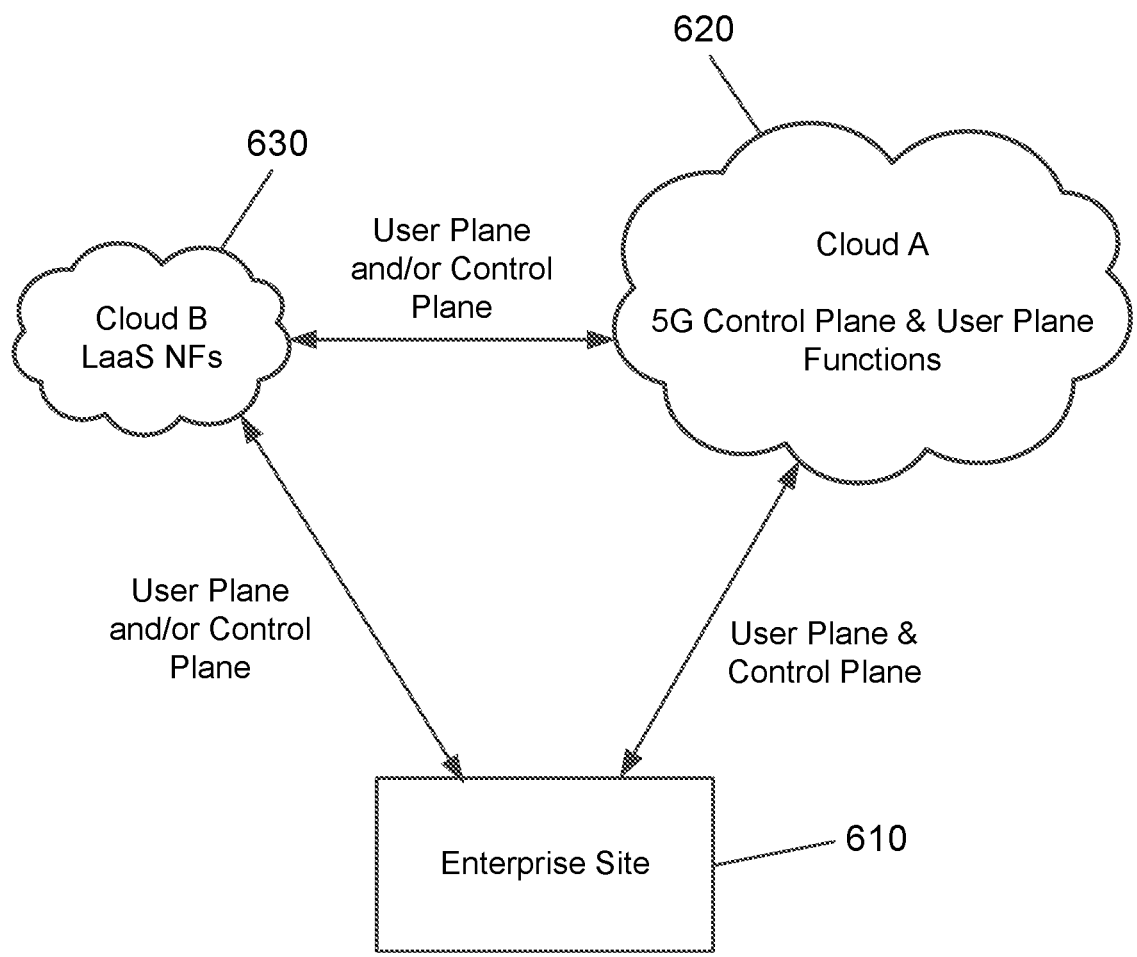
FIG. 6 is an architectural diagram illustrating a multi-cloud system where a 5G provider offers Location as a Service (LaaS) in a different cloud than another services, according to an embodiment of the present invention.

FIG. 6 is an architectural diagram illustrating a multi-cloud system 600 where a 5G provider offers Location as a Service (LaaS) in a different cloud than another services, according to an embodiment of the present invention. LaaS includes GMLC and LMF functions that are expensive. The 5G provider chooses to instantiate the LaaS NFs in cloud B 630 due to performance, capacity, cost, and/or any other key performance indicators (KPIs). Enterprise site 610 uses cloud B 630 for LaaS communications and cloud A 620 for all other NFs.

LaaS supports two classes of positioning methods: CP and UP. Thus, the UP is connected to the LaaS for UP types of positioning. In some embodiments, the LaaS architecture supports both direct connection to an enterprise (e.g., enterprise site 610) or indirectly through Cloud A 620.

Figure 7:
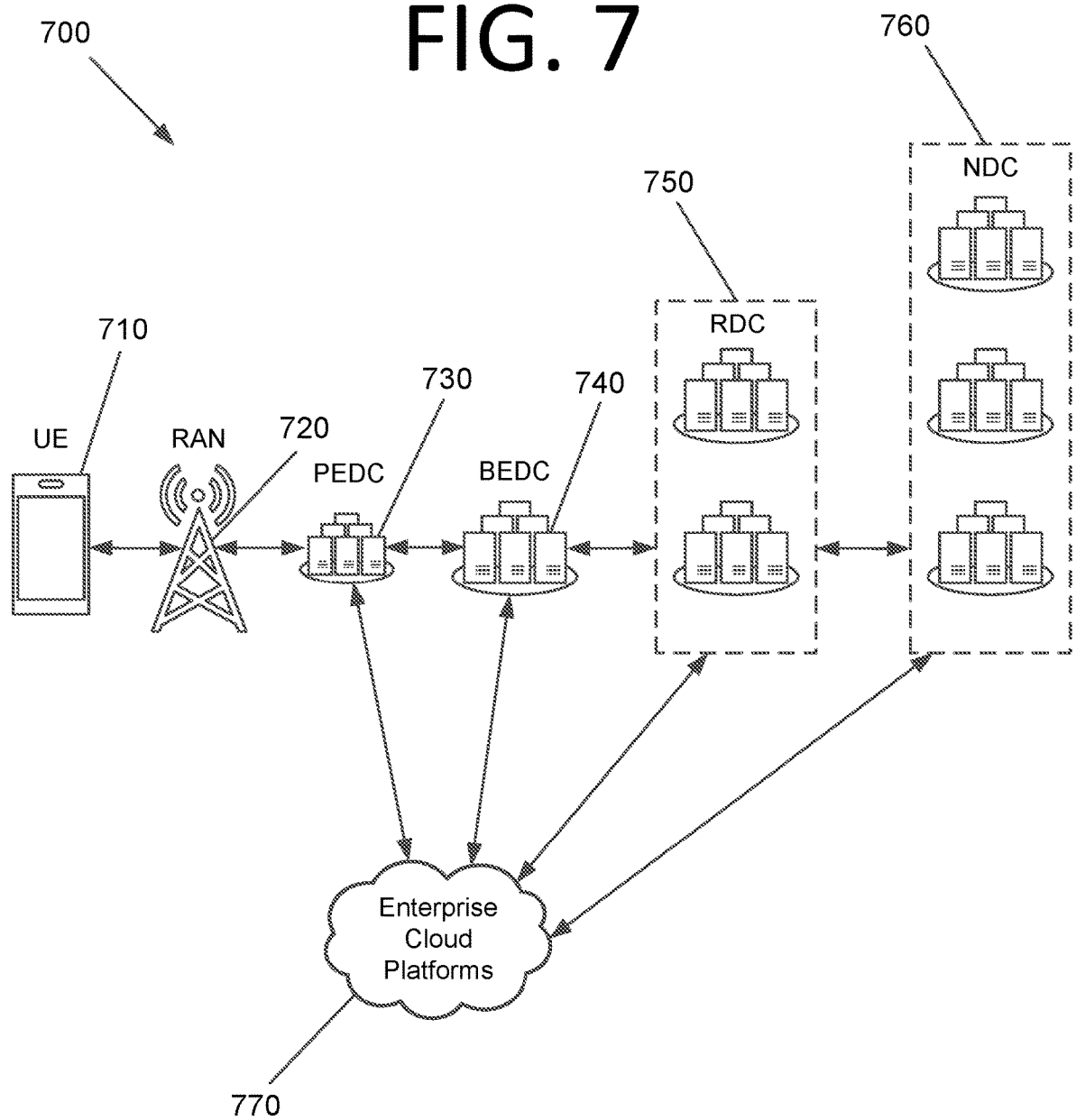
FIG. 7 is an architectural diagram illustrating a telecommunications system, according to an embodiment of the present invention.

FIG. 7 is an architectural diagram illustrating a telecommunications system 700, according to an embodiment of the present invention. User equipment (UE) 710 (e.g., a mobile phone, a tablet, a laptop computer, etc.) communicates with a RAN 720. RAN 720 sends communications to UE 710, as well as from UE 710 into the core carrier network. In some embodiments, communications are sent to/from RAN 720 via a Performance Edge Data Center (PEDC) 730 to provide lower latency. However, in some embodiments, RAN 720 communicates directly with a Breakout Edge Data Center (BEDC) 740 or a Regional Data Center (RDC) 750. BEDCs are typically smaller data centers that are proximate to the populations they serve. BEDCs may break out User Plane Function data traffic (UPF-d) and provide cloud computing resources and cached content to UE 710, such as providing NF application services for gaming, enterprise applications, etc. In certain embodiments, RAN 720 may include a Local Data Center (LDC) (not shown) that hosts one or more Distributed Units (DUs) in a 5G Open RAN (O-RAN) architecture. In some O-RAN embodiments, a centralized unit (CU) may be located at BEDC 740 or an LDC. LDCs, PEDCs, and/or BEDCs may provide MEC services in some embodiments.

The carrier network may provide various NFs and other services. For instance, BEDC 740 may provide cloud computing resources and cached content to mobile device 710, such as providing NF application services for gaming, enterprise applications, etc. An RDC 750 may provide core network functions, such as UPF-v, UPF-d (if not in PEDC 730 or BEDC 740, for example), SMF, and AMF functionality. The SMF includes PGW Control Plane (PGW-C) functionality. The UPF includes PGW User Data Plane (PGW-U) functionality.

A National Data Center (NDC) 760 may provide UDR and user verification services, for example. Other network services that may be provided may include, but are not limited to, IMS+TAS, IP-SM-GW (i.e, the network functionality that provides the messaging service in the IMS network), E-SMLC, GMLC, LRF, LMF, HLR, HSS, UDM, AUSF, UDR, SMSC, PCF, NEF, NRF, NSSF, SCP, and/or SEPP functionality. It should be noted that additional and/or different network functionality may be provided without deviating from the present invention. The various functions in these systems may be performed using dockerized clusters in some embodiments.

BEDC 740 may utilize other data centers for NF authentication services. RDC 750 receives NF authentication requests from BEDC 740. RDC 750 may help with managing user traffic latency, for instance. However, RDC 750 may not perform NF authentication in some embodiments.

From RDC 750, NF authentication requests may be sent to NDC 760, which may be located far away from UE 710, RAN 720, PEDC 730, BEDC 740, and RDC 750. NDC 760 may provide a UDR, and user verification may be performed at NDC 760. Enterprise cloud platforms 770 may host certain NFs themselves. In such embodiments, PEDC 730, BEDC 740, RDC 750, and/or NDC 760 may communicate with enterprise platforms (e.g., to allow NFs in enterprise cloud platforms to access services provided by NFs in the carrier network). The NRF may be located on computing systems of PEDC 730, BEDC 740, RDC 750, and/or NDC 760, and may expose carrier NFs to those of enterprise cloud platforms 770.

Figure 8:
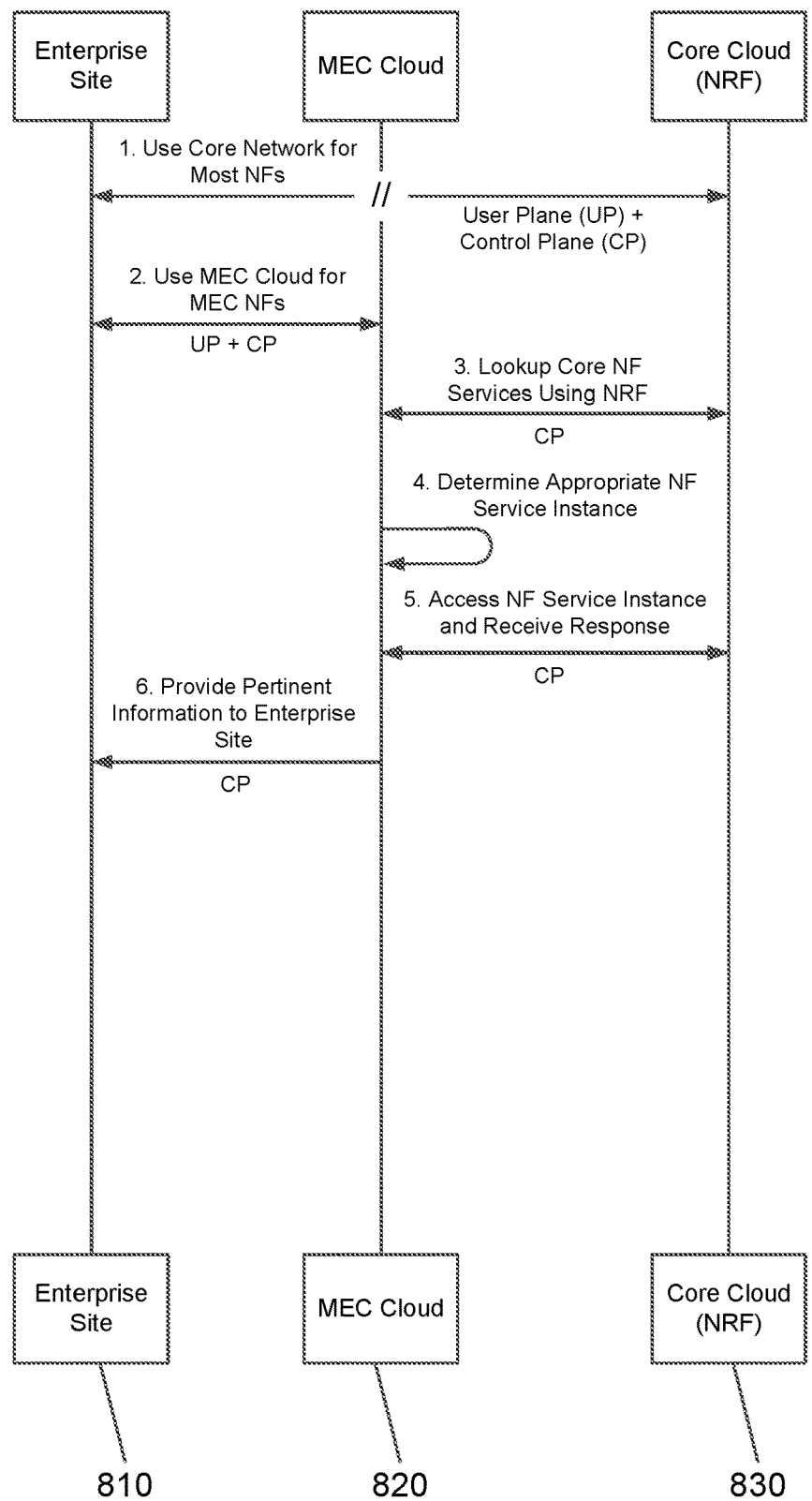
FIG. 8 is a flow diagram illustrating a process for providing MEC in one cloud and providing other NFs another cloud, according to an embodiment of the present invention.

FIG. 8 is a flow diagram illustrating a process 800 for providing MEC in one cloud and providing other NFs another cloud, according to an embodiment of the present invention. A core network cloud 830 is used by mobile computing systems of an enterprise site 810 for most NFs. However, the computing systems of enterprise site 810 use an MEC cloud 820 for MEC NFs. The MEC NFs in MEC cloud 820 look up NF services in core cloud 830 using an NRF. The MEC NFs determine the appropriate NF service instances, access these NF service instances, and receive responses therefrom (e.g., with the requested information). The MEC NFs then provide pertinent information to computing systems of enterprise site 810.

Figure 9:
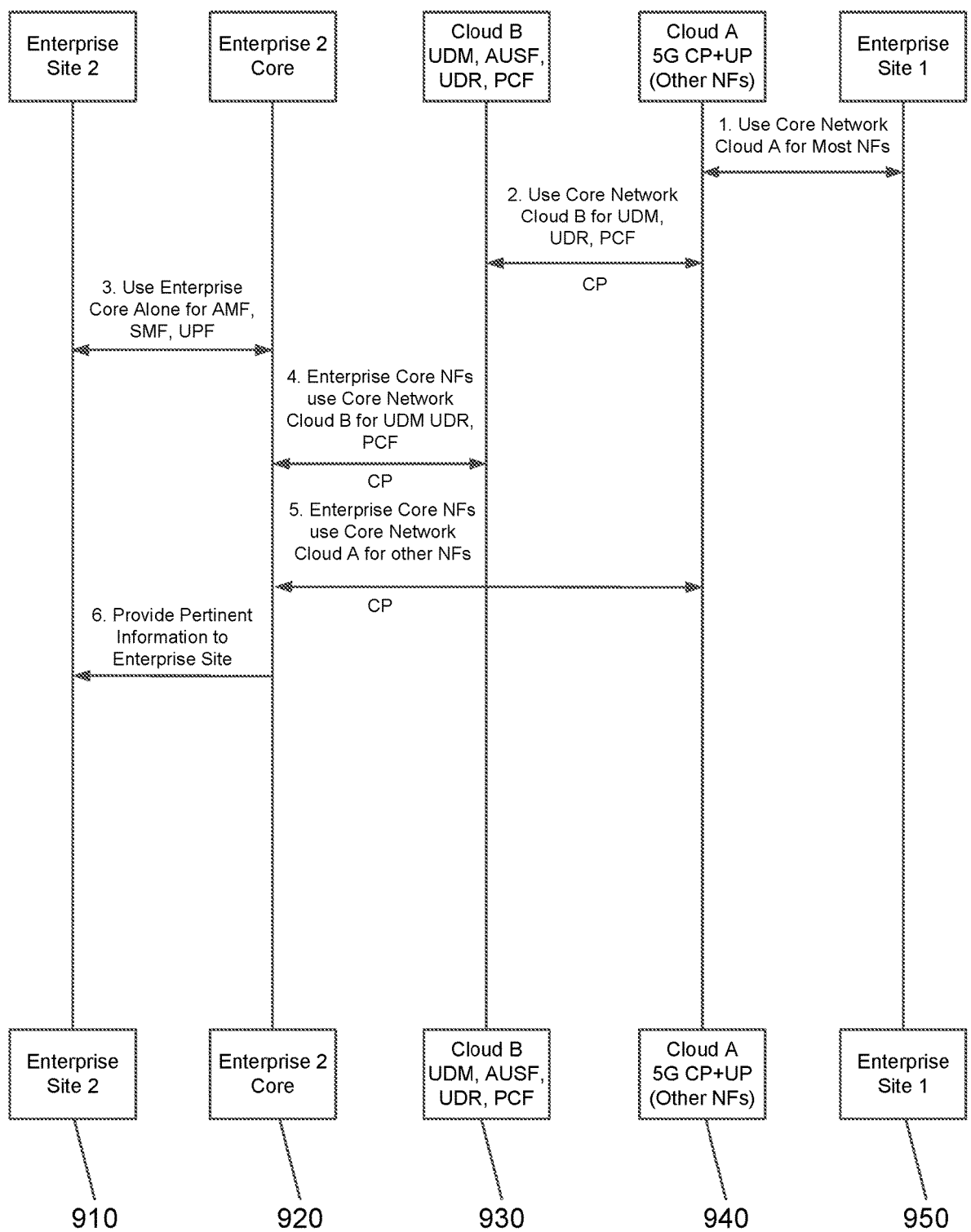
FIG. 9 is a flow diagram illustrating a process for providing certain NFs in two clouds where an enterprise has its own core, according to an embodiment of the present invention.

FIG. 9 is a flow diagram illustrating a process 900 for providing certain NFs in two clouds where an enterprise has its own core, according to an embodiment of the present invention. Computing systems of a first enterprise site 950 use carrier core network cloud A 940 and carrier core network cloud B 930 for all NFs. In this case, carrier core network cloud B 930 provides UDM, AUSF, UDR, and PCF and carrier core network cloud A 940 provides all other NFs. However, it should be noted that any sets of NFs may be provided by carrier core network cloud A 940 and carrier core network cloud B 930 without deviating from the scope of the invention.

A second enterprise, however, has its own enterprise core 920 that provides certain NFs, such as AMF, SMF, UPF, and radio. Computing systems of second enterprise site 910 use enterprise core 920 for these services. However, for UDM, AUSF, UDR, and PCF, enterprise core 920 uses carrier core network cloud B 930 and for other NFs, enterprise core 920 uses carrier core network cloud A 940.

Figure 10:
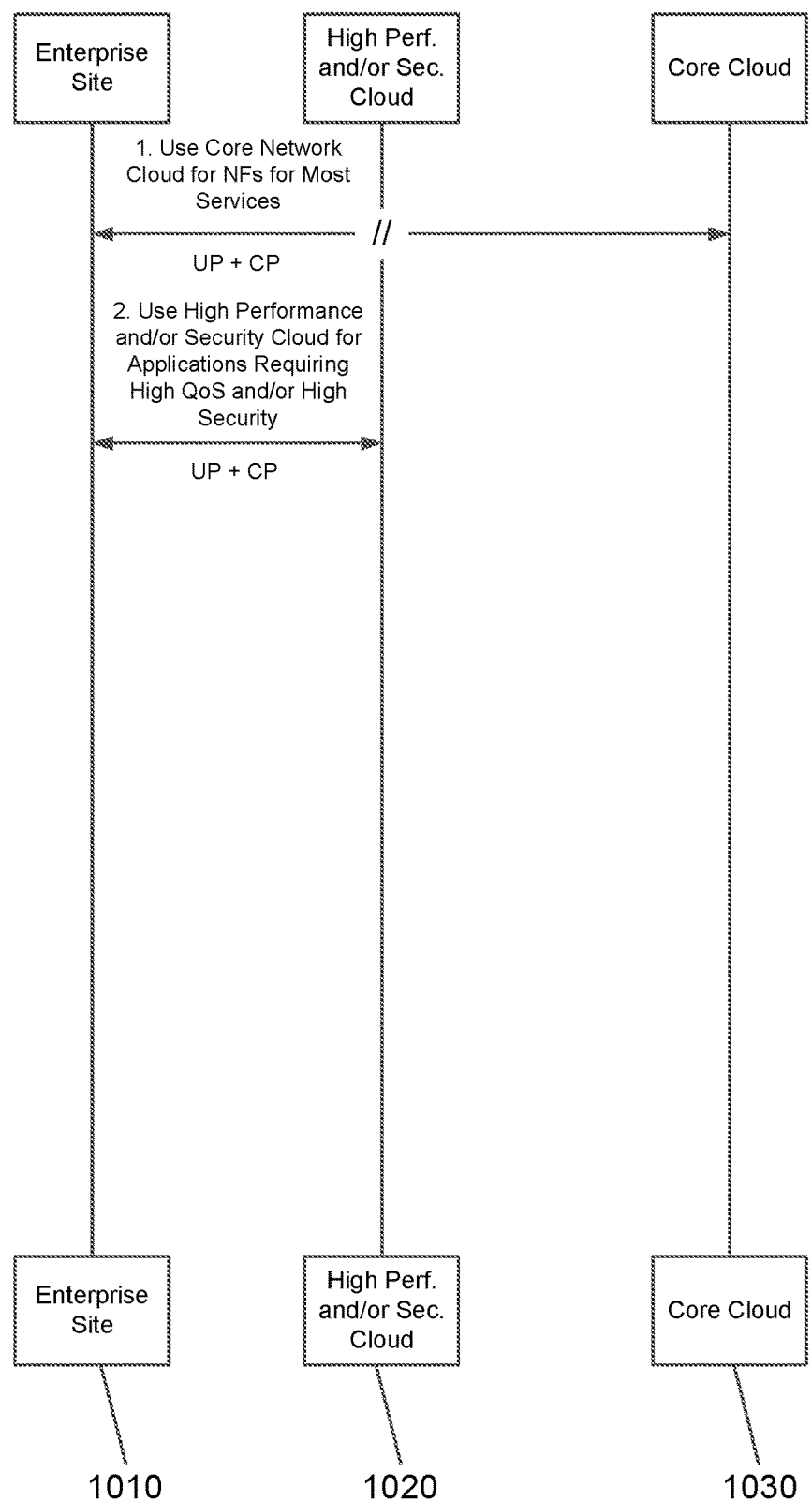
FIG. 10 is a flow diagram illustrating a process for providing a high QoS and/or security cloud and a 5G provider core network cloud, according to an embodiment of the present invention.

FIG. 10 is a flow diagram illustrating a process 1000 for providing a high QoS and/or security cloud and a 5G provider core network cloud, according to an embodiment of the present invention. Computing systems of an enterprise site 1010 use a 5G provider core cloud 1030 for most services such as voice, Internet, etc. However, certain applications running on these computing systems require a higher QoS and/or a higher level of security. For these applications, the computing systems of enterprise site 1010 use a high performance and/or security cloud 1020.

Figure 11:
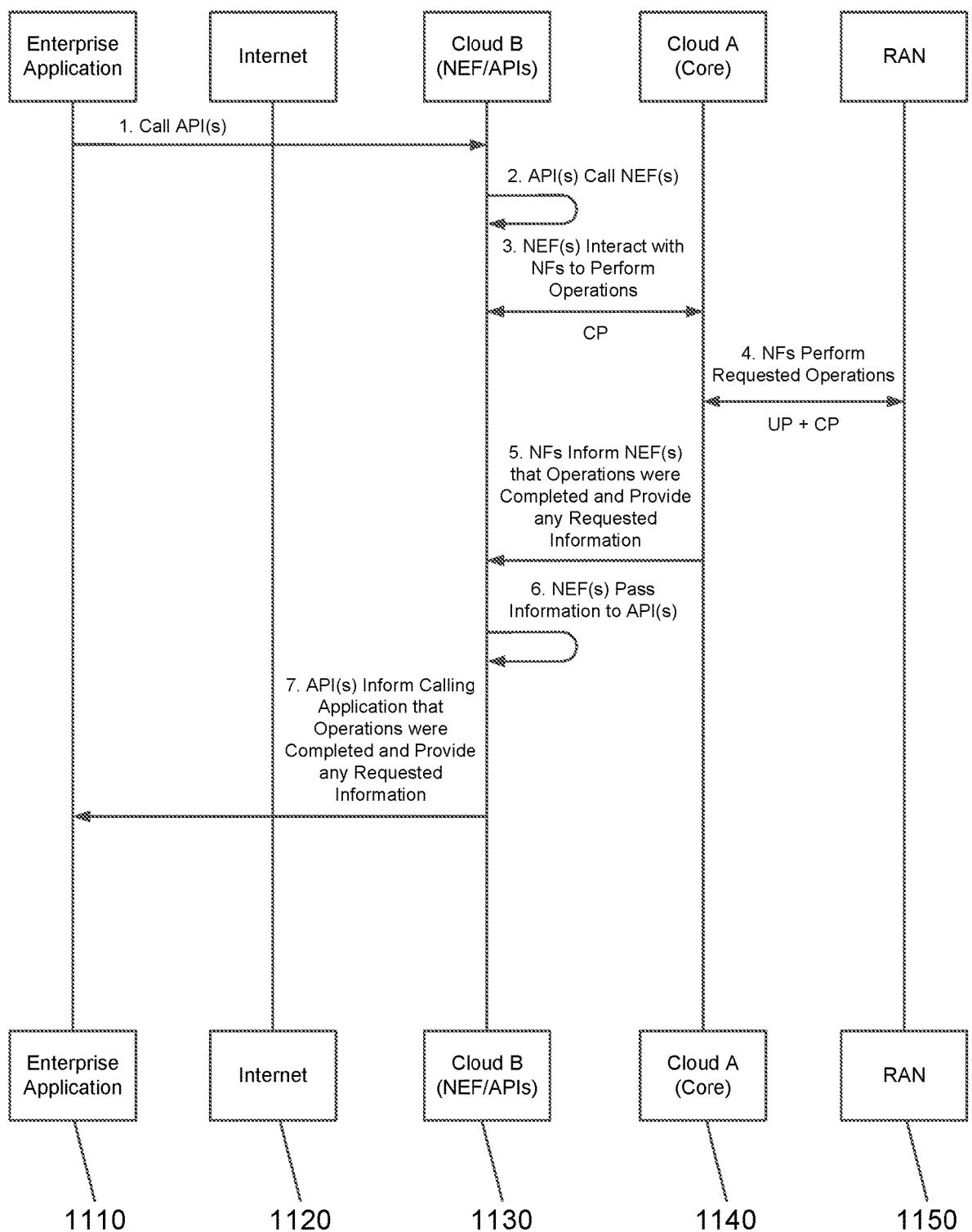
FIG. 11 is aa flow diagram illustrating a process for providing a multi-cloud system where a 5G provider exposes its 5G core network to enterprise applications through APIs, according to an embodiment of the present invention.

FIG. 11 is a flow diagram illustrating a process for providing a multi-cloud system 1100 where a 5G provider exposes its 5G core network to enterprise applications through APIs, according to an embodiment of the present invention. The process begins with an enterprise application 1110 calling API(s) on cloud B 1130 via the Internet 1120. The API(s) call one or more NEFs on cloud B 1130 exposed by the carrier. The NEF(s), in turn, interact with NFs of the carrier on core cloud A 1140 to perform the desired operations, such as monitoring, provisioning, policy control, etc.

The NFs obtain the desired information or make the desired changes to mobile devices via a RAN 1150. The NFs then inform the NEF(s) that the operations were completed and provide any requested information associated with the operations thereto. The NEF(s) pass this information to the API(s), and the API(s) inform the calling application that the operations were completed and provide any requested information.

Figure 12:
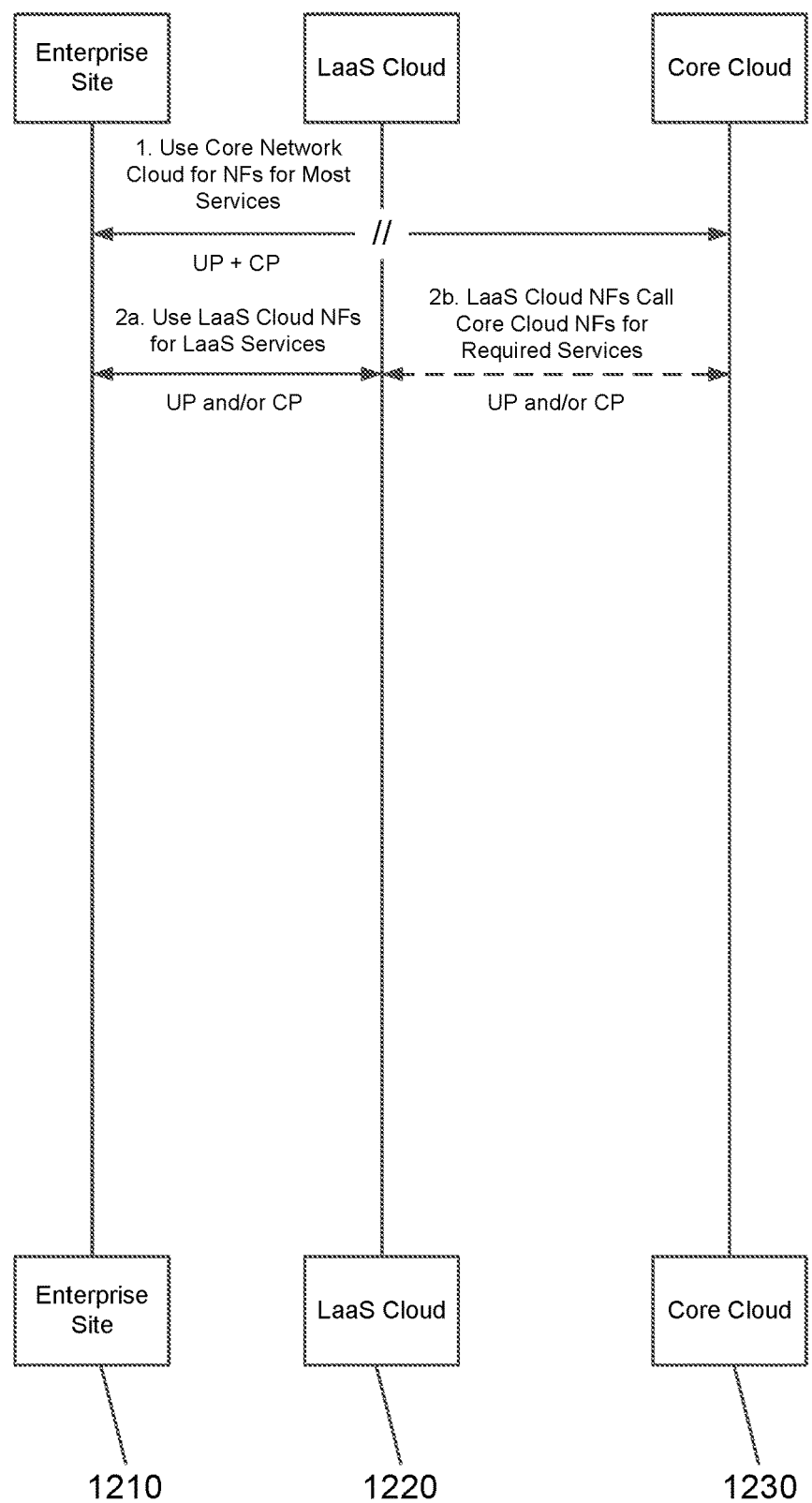
FIG. 12 is a flow diagram illustrating a process for providing LaaS in one cloud and other 5G services in another cloud, according to an embodiment of the present invention.

FIG. 12 is a flow diagram illustrating a process 1200 for providing LaaS in one cloud and other 5G services in another cloud, according to an embodiment of the present invention. Computing systems of enterprise site 1210 use NFs of a core network cloud 1230 for most services. However, for LaaS services such as GMLC and LMF, the computing systems of enterprise site 1210 use LaaS NFs in LaaS cloud 1220. LaaS NFs communicate with NFs of core cloud 1230 for other NF services that may be required by the LaaS NFs.

Figure 13:
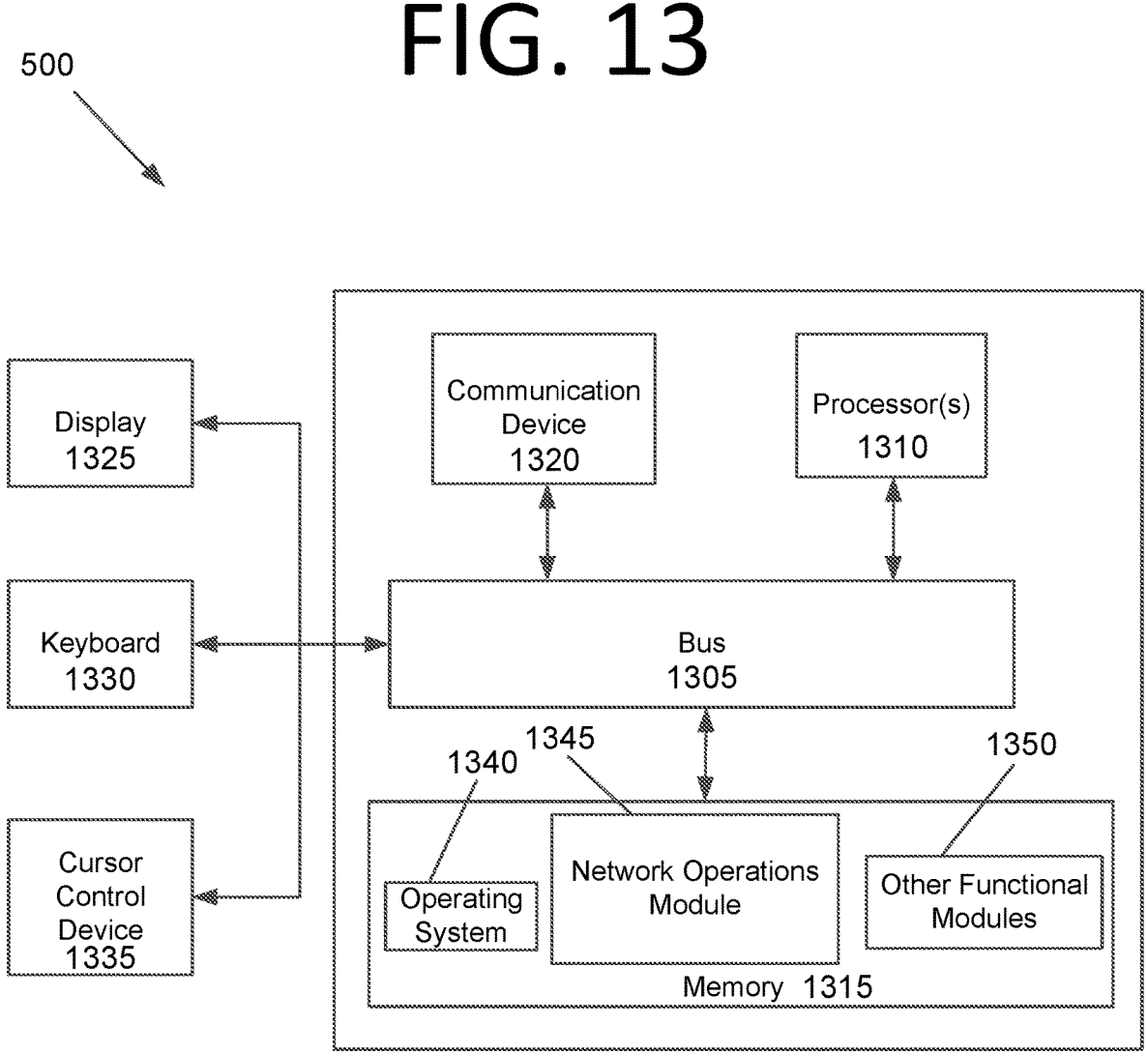
FIG. 13 is an architectural diagram illustrating a computing system configured to participate in a multiple data center architecture for providing NFs in telecommunications networks, according to an embodiment of the present invention.

FIG. 13 is an architectural diagram illustrating a computing system 1300 configured to participate in a multiple data center architecture for providing NFs in telecommunications networks, according to an embodiment of the present invention. In some embodiments, computing system 1300 may be one or more of the computing systems depicted and/or described herein, such as an enterprise mobile device or other computing system, a server in a cloud, a computing system of a RAN, a user mobile device, another carrier network server or other type of computing system, etc. Computing system 1300 includes a bus 1305 or other communication mechanism for communicating information, and processor(s) 1310 coupled to bus 1305 for processing information. Processor(s) 1310 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1310 may also have multiple processing cores, and at least some of the cores may be configured to perform specific functions. Multi-parallel processing may be used in some embodiments. In certain embodiments, at least one of processor(s) 1310 may be a neuromorphic circuit that includes processing elements that mimic biological neurons. In some embodiments, neuromorphic circuits may not require the typical components of a Von Neumann computing architecture.

Computing system 1300 further includes memory 1315 for storing information and instructions to be executed by processor(s) 1310. Memory 1315 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 1310 and may include volatile media, non-volatile media, or both. The media may also be removable, non-removable, or both.

Additionally, computing system 1300 includes a communication device 1320, such as a transceiver, to provide access to a communications network via a wireless and/or wired connection. In some embodiments, communication device 1320 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), 5G, 6G, New Radio (NR), any combination thereof, and/or any other currently existing or future-implemented communications standard and/or protocol without deviating from the scope of the invention. In some embodiments, communication device 1320 may include one or more antennas that are singular, arrayed, phased, switched, beamforming, beamsteering, a combination thereof, and or any other antenna configuration without deviating from the scope of the invention.

Processor(s) 1310 are further coupled via bus 1305 to a display 1325, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 1325 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 1330 and a cursor control device 1335, such as a computer mouse, a touchpad, etc., are further coupled to bus 1305 to enable a user to interface with computing system 1300. However, in certain embodiments, a physical keyboard and mouse may not be present, and the user may interact with the device solely through display 1325 and/or a touchpad (not shown). Any type and combination of input devices may be used as a matter of design choice. In certain embodiments, no physical input device and/or display is present. For instance, the user may interact with computing system 1300 remotely via another computing system in communication therewith, or computing system 1300 may operate autonomously.

Memory 1315 stores software modules that provide functionality when executed by processor(s) 1310. The modules include an operating system 1340 for computing system 1300. The modules further include a network operations module 1345 that is configured to perform all or part of the processes described herein or derivatives thereof. Computing system 1300 may include one or more additional functional modules 1350 that include additional functionality.

One skilled in the art will appreciate that a "computing system" could be embodied as a server, an embedded computing system, a personal computer, a console, a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module.

Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

FIG. 14 is a flowchart illustrating a process 1400 for providing multi-cloud telecommunications services, according to an embodiment of the present invention. The process begins with hosting one or more NFs on a first cloud system at 1410 and hosting one or more other NFs on a second cloud system at 1420. The NFs are registered via an NRF so they can find one another across the cloud systems at 1430. The NRF may be hosted in the first cloud system, the second cloud system, or one or more computing systems that are not a part of the first cloud system or the second cloud system.

In some embodiments the one or more NFs of the first cloud system include AMF, SMF, PCF, NSSF, UDM, AUSF, UDR, and UPF, the one or more NFs of the second cloud system include one or more MEC NFs configured to support MEC, and the second cloud system supports lower latency communications and a higher QoS than the first cloud system. In certain embodiments, NFs are hosted in three or more cloud systems and collectively managed by the NRF. In some such embodiments, one or more respective NFs of the third cloud system include AMF, SMF, and UPF, the one or more NFs of the second cloud system include PCF, AUSF, UDM, and UDR, and the one or more NFs of the third cloud system and the one or more NFs of the second cloud system find one another using the NRF and communicate with one another over a control plane between the third cloud computing system and the second cloud computing system. In some embodiments, the second cloud system provides a better QoS and/or higher security than the first cloud computing system, the second cloud system is configured to provide the higher QoS and/or security for a subset of services, and the first cloud system is configured to provide other services, the other services comprising voice services.

In some embodiments, the second cloud system includes one or more NEFs configured to expose respective NFs of the one or more respective NFs of the first cloud system to external applications and one or more APIs configured to call the one or more NEFs. In certain embodiments, the one or more NEFs are configured push settings changes to or receive information from one or more mobile devices accessible by one or more RANs using the one or more respective NFs. In some embodiments, the one or more NEFs are configured to facilitate network event monitoring, data provisioning, and/or policy control.

In some embodiments, the one or more NFs of the second cloud system provide LaaS and communicate via control plane signaling with at least one NF of the first cloud system. In certain embodiments, the one or more LaaS NFs include GMLC and LMF. In some embodiments, the one or more NFs of the first cloud system, the one or more NFs of the second cloud system, or both, are CNFs or VNFs implemented by a platform for automating deployment, scaling, and management of containerized applications.

The process steps performed in FIGS. 8-12 and 14 may be performed by computer program(s), encoding instructions for the processor(s) to perform at least part of the process(es) described in FIGS. 8-12 and 14 in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 1310 of computing system 1300 of FIG. 13) to implement all or part of the process steps described in FIGS. 8-12 and 14 which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A multi-cloud system for providing telecommunications services, comprising:
one or more computing systems of a first cloud system hosting one or more respective Network Functions (NFs);
one or more computing systems of a second cloud system hosting one or more respective NFs; and
a Network Repository Function (NRF) hosted by at least one computing system of the one or more computing systems of the first cloud system, at least one computing system of the one or more computing systems of the second cloud system, or one or more other computing systems that are not a part of the first cloud system or the second cloud system, wherein
the NRF manages the one or more NFs of the first cloud system and the second cloud system, respectively, and
the one or more respective NFs of the first cloud system and the one or more respective NFs of the second cloud system find one another using the NRF and communicate with one another over a control plane between the first cloud computing system and the second cloud computing system.

2. The multi-cloud system of claim 1, wherein
the one or more respective NFs of the first cloud system comprise an Access and Mobility Management Function (AMF), a Session Management Function (SMF), a Policy Control Function (PCF), an Authentication Server Function (AUSF), Unified Data Management (UDM), a Unified Data Repository (UDR), a User Plane Function (UPF), or any combination thereof,
the one or more respective NFs of the second cloud system comprise one or more Mobile Edge Computing (MEC) NFs configured to support MEC, and
the second cloud system supports lower latency communications and a higher Quality of Service (QOS) than the first cloud system.

3. The multi-cloud system of claim 1, further comprising:
one or more computing systems of a third cloud system hosting one or more respective NFs, wherein
the one or more respective NFs of the third cloud system comprise an Access and Mobility Management Function (AMF), a Session Management Function (SMF), and a User Plane Function (UPF),
the one or more respective NFs of the second cloud system comprise a Policy Control Function (PCF), an Authentication Server Function (AUSF), Unified Data Management (UDM), a Unified Data Repository (UDR), or any combination thereof, and
the one or more respective NFs of the third cloud system and the one or more respective NFs of the second cloud system find one another using the NRF and communicate with one another over a control plane between the third cloud computing system and the second cloud computing system.

4. The multi-cloud system of claim 1, wherein
the second cloud system provides a better Quality of Service (QOS) and/or higher security than the first cloud computing system,
the second cloud system is configured to provide the higher QoS and/or security for a subset of services, and
the first cloud system is configured to provide other services, the other services comprising voice services.

5. The multi-cloud system of claim 1, wherein the second cloud system comprises:
one or more Network Exposure Functions (NEFs) and/or Common Application Programming Interface (API) Frameworks (CAPIFs) configured to expose respective NFs of the one or more respective NFs of the first cloud system to external applications; and
one or more Application Programming Interfaces (APIs) configured to call the one or more NEFs.

6. The multi-cloud system of claim 5, wherein the one or more NEFs and/or CAPIFs are configured push settings changes to or receive information from one or more mobile devices accessible by one or more Radio Access Networks (RANs) using the one or more respective NFs.

7. The multi-cloud system of claim 6, wherein the one or more NEFs and/or CAPIFs are configured to facilitate network event monitoring, data provisioning, and/or policy control.

8. The multi-cloud system of claim 1, wherein
the one or more respective NFs of the second cloud system provide Location as a Service (LaaS), and
the one or more LaaS NFs of the second cloud system are configured to communicate via user plane and/or control plane signaling with at least one NF of the one or more respective NFs of the first cloud system.

9. The multi-cloud system of claim 8, wherein the one or more LaaS NFs comprise a Gateway Mobile Location Center (GMLC) and a Location Management Function (LMF).

10. The multi-cloud system of claim 1, wherein the one or more respective NFs of the first cloud system, the one or more respective NFs of the second cloud system, or both, are containerized NFs (CNFs) or virtual NFs (VNFs) implemented by a platform for automating deployment, scaling, and management of containerized applications.

11. A multi-cloud system for providing telecommunications services, comprising:
one or more computing systems of a first cloud system hosting one or more respective Network Functions (NFs);
one or more computing systems of a second cloud system hosting one or more respective NFs; and
a Network Repository Function (NRF) hosted by at least one computing system of the one or more computing systems of the first cloud system, at least one computing system of the one or more computing systems of the second cloud system, or one or more other computing systems that are not a part of the first cloud system or the second cloud system, wherein
the NRF manages the one or more NFs of the first cloud system and the second cloud system, respectively, and
the one or more respective NFs of the first cloud system, the one or more respective NFs of the second cloud system, or both, are containerized NFs (CNFs) or virtual NFs (VNFs) implemented by a platform for automating deployment, scaling, and management of containerized applications.

12. The multi-cloud system of claim 11, wherein the one or more respective NFs of the first cloud system and the one or more respective NFs of the second cloud system find one another using the NRF and communicate with one another over a control plane between the first cloud computing system and the second cloud computing system.

13. The multi-cloud system of claim 11, wherein
the one or more respective NFs of the first cloud system comprise an Access and Mobility Management Function (AMF), a Session Management Function (SMF), a Policy Control Function (PCF), an Authentication Server Function (AUSF), Unified Data Management (UDM), a Unified Data Repository (UDR), a User Plane Function (UPF), or any combination thereof,
the one or more respective NFs of the second cloud system comprise one or more Mobile Edge Computing (MEC) NFs configured to support MEC, and
the second cloud system supports lower latency communications and a higher Quality of Service (QOS) than the first cloud system.

14. The multi-cloud system of claim 11, further comprising:
one or more computing systems of a third cloud system hosting one or more respective NFs, wherein
the one or more respective NFs of the third cloud system comprise an Access and Mobility Management Function (AMF), a Session Management Function (SMF), and a User Plane Function (UPF),
the one or more respective NFs of the second cloud system comprise a Policy Control Function (PCF), an Authentication Server Function (AUSF), Unified Data Management (UDM), a Unified Data Repository (UDR), or any combination thereof, and
the one or more respective NFs of the third cloud system and the one or more respective NFs of the second cloud system find one another using the NRF and communicate with one another over a control plane between the third cloud computing system and the second cloud computing system.

15. The multi-cloud system of claim 11, wherein
the second cloud system provides a better Quality of Service (QOS) and/or higher security than the first cloud computing system,
the second cloud system is configured to provide the higher QoS and/or security for a subset of services, and
the first cloud system is configured to provide other services, the other services comprising voice services.

16. The multi-cloud system of claim 11, wherein the second cloud system comprises:
one or more Network Exposure Functions (NEFs) and/or Common Application Programming Interface (API) Frameworks (CAPIFs) configured to expose respective NFs of the one or more respective NFs of the first cloud system to external applications; and
one or more Application Programming Interfaces (APIs) configured to call the one or more NEFs and/or CAPIFs, wherein
the one or more NEFs and/or CAPIFs are configured push settings changes to or receive information from one or more mobile devices accessible by one or more Radio Access Networks (RANs) using the one or more respective NFs, and
the one or more NEFs and/or CAPIFs are configured to facilitate network event monitoring, data provisioning, and/or policy control.

17. The multi-cloud system of claim 11, wherein
the one or more respective NFs of the second cloud system provide Location as a Service (LaaS), the one or more LaaS NFs comprising a Gateway Mobile Location Center (GMLC) and a Location Management Function (LMF), and
the one or more LaaS NFs of the second cloud system are configured to communicate via user plane and/or control plane signaling with at least one NF of the one or more respective NFs of the first cloud system.

18. A multi-cloud system, comprising:
one or more computing systems of a first cloud system hosting one or more respective Network Functions (NFs);
one or more computing systems of a second cloud system hosting one or more respective NFs, one or more Network Exposure Functions (NEFs) and/or Common Application Programming Interface (API) Frameworks (CAPIFs) configured to expose respective NFs of the one or more respective NFs of the first cloud system to external applications, and one or more Application Programming Interfaces (APIs) configured to call the one or more NEFs and/or CAPIFs; and
a Network Repository Function (NRF) hosted by at least one computing system of the one or more computing systems of the first cloud system, at least one computing system of the one or more computing systems of the second cloud system, or one or more other computing systems that are not a part of the first cloud system or the second cloud system, wherein
the NRF manages the one or more NFs of the first cloud system and the second cloud system, respectively,
the one or more respective NFs of the first cloud system and the one or more respective NFs of the second cloud system find one another using the NRF and communicate with one another over a control plane between the first cloud computing system and the second cloud computing system,
the one or more respective NFs of the first cloud system, the one or more respective NFs of the second cloud system, or both, are containerized NFs (CNFs) or virtual NFs (VNFs) implemented by a platform for automating deployment, scaling, and management of containerized applications.

19. The multi-cloud system of claim 18, wherein the one or more NEFs and/or CAPIFs are configured push settings changes to or receive information from one or more mobile devices accessible by one or more Radio Access Networks (RANs) using the one or more respective NFs.

20. The multi-cloud system of claim 19, wherein the one or more NEFs and/or CAPIFs are configured to facilitate network event monitoring, data provisioning, and/or policy control.

* * * * *